No. 695,448. Patented Mar. 18, 1902.
G. E. EVANS.
WHEEL.
(Application filed Aug. 30, 1901.)
(No Model.) 2 Sheets—Sheet 1.
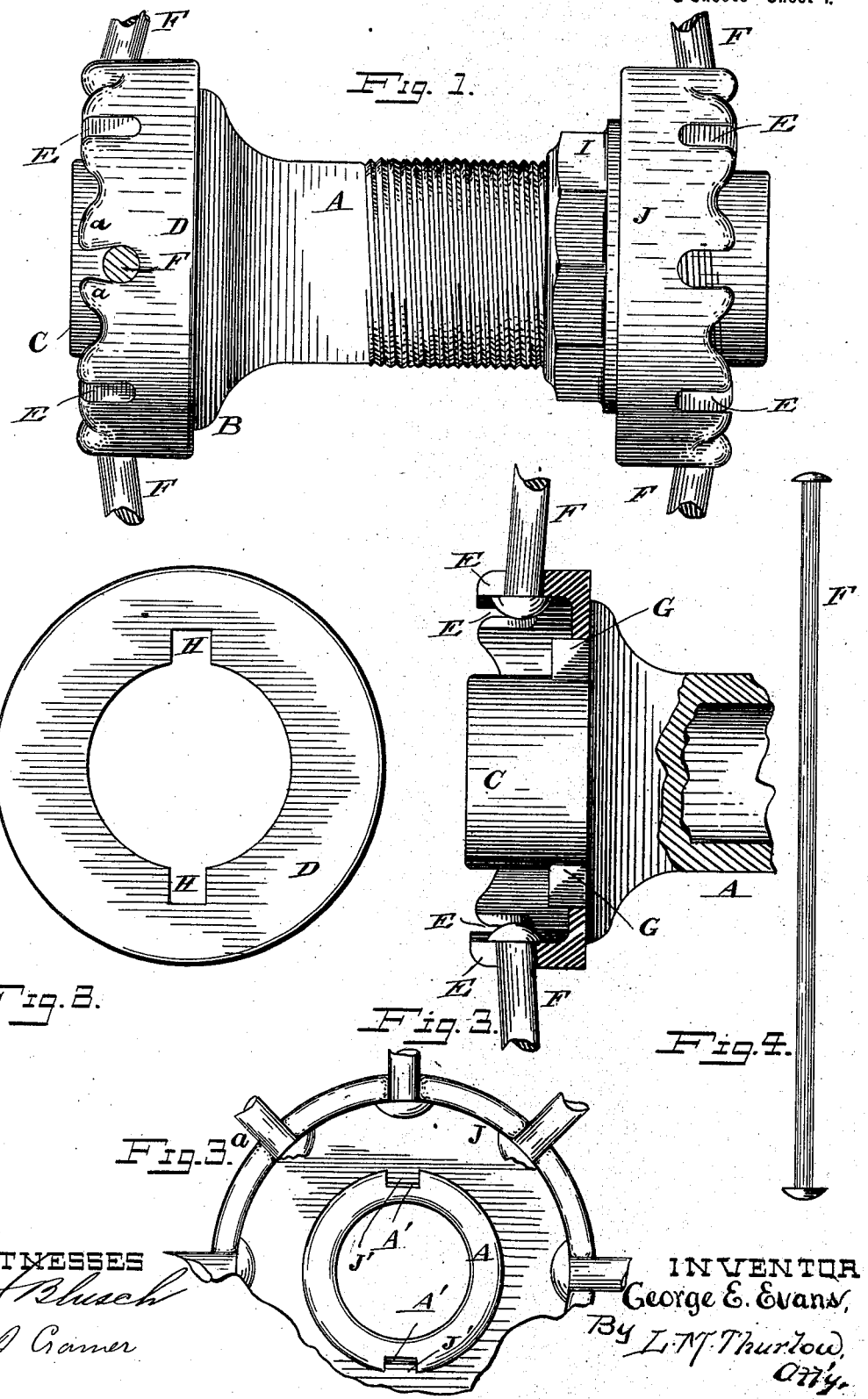
WITNESSES
INVENTOR
George E. Evans,
By L. N. Thurlow,
Atty.

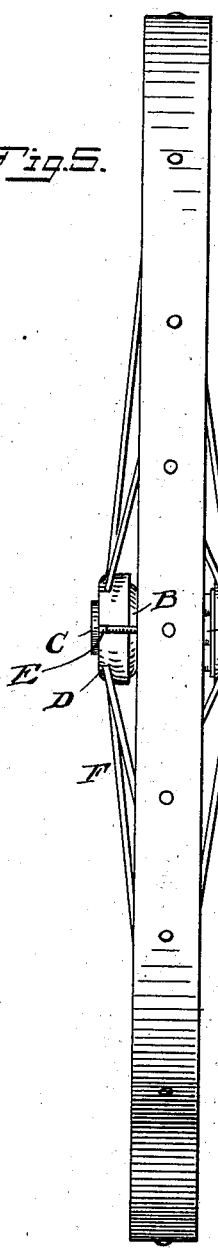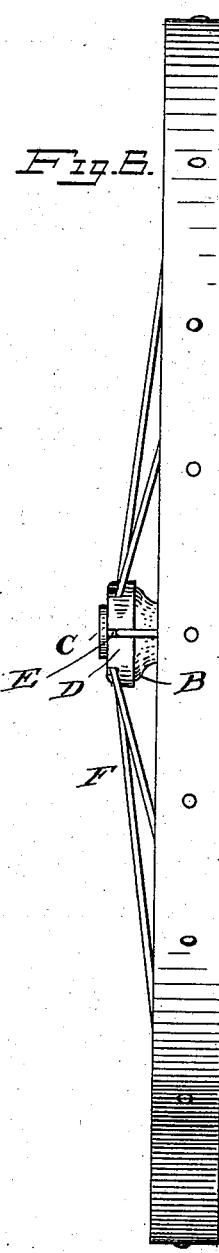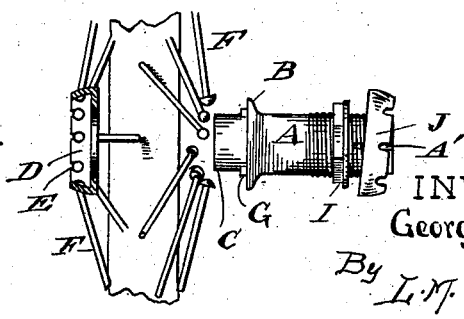

UNITED STATES PATENT OFFICE.

GEORGE E. EVANS, OF PEORIA, ILLINOIS, ASSIGNOR TO KINGMAN PLOW COMPANY, OF PEORIA, ILLINOIS, A CORPORATION OF ILLINOIS.

WHEEL.

SPECIFICATION forming part of Letters Patent No. 695,448, dated March 18, 1902.

Application filed August 30, 1901. Serial No. 73,784. (No model.)

*To all whom it may concern:*

Be it known that I, GEORGE E. EVANS, a citizen of the United States, residing at Peoria, in the county of Peoria and State of Illinois, have invented certain new and useful Improvements in Wheels; and I do hereby declare that the following is a full, clear, and exact description of the invention, which will enable others skilled in the art to which it appertains to make and use the same.

This invention pertains to improvements in wheels, and more particularly to wheels for use on cultivators and other farm implements, as well as wagons and vehicles of like nature.

The object of my invention is to construct a wheel that can be assembled in a very few moments ready for use.

A further object is to provide a wheel which while being assembled will be trued at the same time.

A still further object is to produce a wheel in which every spoke will receive the same amount of tension.

Furthermore, an object is to make a wheel from which the old worn-out hub can be removed and replaced by a new one.

In the appended drawings, Figure 1 is a front view of the hub of my improved wheel. Fig. 2 is a side view of a spoke-holder. Fig. 3 is a front view of a portion of the hub, showing the spoke-holder in section with spokes therein. Fig. 3ª is an end view of the hub, showing a spoke-holder. Fig. 4 is a view of one of the spokes much reduced in size. Fig. 5 is an edge view of the complete wheel before tension is applied thereto. Fig. 6 is also an edge view of the completed wheel with the tension applied. Fig. 7 is a cross-section of the wheel and rim, showing the laxed position and the position when under tension. Fig. 8 is an edge view of part of the inside of the wheel, showing the hub removed and the spokes disengaged therefrom at one side.

My invention seeks to overcome the disadvantages of wheels in general which are of such a construction that they are costly and consume too much time in their manufacture, whose rims do not run true, and, lastly, are not the same tension throughout its parts.

In the figures, A represents the hub of my improved wheel, having a shoulder B near one end, beyond which is a projection C of the hub. Said projection extends beyond the shoulder some distance and receives a spoke-holder D. This latter member consists of a cup having an opening therethrough by which it may be slipped upon the hub against the shoulder B. The flange of this holder is parallel with and extends over the hub end C, as shown in Fig. 3, and is slotted at E for receiving the headed ends of the spokes F. The hub carries two lugs G G at diametrically opposite sides, and notches H H in the cup or holder D correspond therewith. Said notches receive the lugs and prevent said holder from turning upon the hub, as will be understood. The other extremity of the said hub A is screw-threaded externally and receives a nut I. A spoke-holder J, corresponding with D, is slipped over the hub, its opening being larger in diameter than the threaded hub, so as to permit said holder to move freely back and forth. The latter member while similar to the holder D does not have the notches H, nor does the hub at this end have the lugs G, but is perfectly plain except for the screw-threads described. As shown in the several figures, the slots E of the holders are regularly distributed around the flanges, each being opposite the spoke-hole in the wheel-rim. As shown in Figs. 5 and 6, the slots in the spoke-holder are staggered as to the hubs only. In other words, the slots of one are set midway between those of the other, and every second spoke is held in one of the holders D and J.

In assembling the wheel parts the rim is drilled as usual, and the spokes, which are of an equal length, are headed at one end and either dropped in from above through the holes in the rim and headed at the lower end or else inserted from the inside of the wheel and headed at the rim, as desired. In either case the said spokes are headed at both ends, as shown in Fig. 4, and all hang toward the center of the wheel. Now the holder D is held at the hub ends of the spokes at one side, and each of said spokes is pushed into one of the slots of said holder, as shown in Fig. 8. As indicated at *a a*, Fig. 1, the lips at each of the slots E may be slightly closed together around the spokes, so as to prevent the removal thereof, though this need not be done unless desired. The hub A is now inserted at the end C into the holder, as shown in Fig. 3, with the lugs entered into the notches H and the shoulder B against the holder. Then this is followed by the nut I, if not already placed on the hub. Then following the nut is the holder J. The said spokes are slipped into the slots E of the said holder J, and by reason of the position of the said spokes within those of the other holder the slots in each will be midway between each other. In other forms of wheels it is necessary to insert the spokes in the hub and then place nuts upon the ends thus inserted instead of having a fixed head to slide beneath a slot, as described and shown herein. In the drawings, Fig. 3 indicates the shoulder of the hub by the letter B. The nut I, Fig. 1, now being backed up toward the portion J, will move that member toward the end of the hub and at the same time push the hub in the opposite direction against the holder D. It will be understood that by thus moving the nut against the holder J the spokes at that side will be pushed sidewise until their heads are firmly drawn against the rim and holder, and thus prevent further movement of the said holder in that direction. Then the hub must, of course, move in the opposite direction by the continued movement of the nut until the heads of the spokes at the other side are drawn snugly against the rim and holder D. When this occurs, the movement of the hub in one direction and the holder J in the other will be set up equally, thus drawing in the same degree upon every spoke and placing the same tension on each. Continuing the movement of said nut any desired pull may be exerted upon the spokes collectively to make the wheel as round and firm and sound as a single member. Evidently since the spokes are of equal length between the heads the rim will be made perfectly round and true as the nut is tightened. The lips at each side of the slots H of the holder J may be closed, as already described; but it is better to leave them open, since if it is desired to replace a worn-out hub by a new one the spokes can be immediately pulled out of the slots H after slackening the nut without first having to separate the said lips.

In taking the wheel apart the same method of procedure described is followed, except in reverse order, and it is quite easy to replace a worn-out hub by a new one, whereas heretofore a new wheel was necessary when the hub was rendered unfit for use.

Fig. 5 of the drawings shows the wheel before the holders D and J are separated, and Fig. 6 shows these separated and the wheel complete. Fig. 7 indicates the laxed position in full lines and the position under tension in broken lines.

It will be understood that the lugs G on the hub prevent rotary movement of the said hub when the nut I is turned, the spokes serving to hold the parts, as will be evident. In addition to this, however, I have shown in Figs. 3ª and 8 a groove A' in the threaded end of the hub at diametrically opposite sides, and the spoke-holder J is provided with lugs J' to correspond therewith. This arrangement prevents the turning of said holder J in case the spokes would not answer, though it may be found to be unnecessary and need not be used. It serves another good purpose in acting as a lock for the nut I, so that it cannot loosen by jarring or thumping.

I am aware of certain wheels that employ the same general principles as I describe; but no provision is made therein for removing the hub by first slipping the spokes from the holders, and to this feature I wish to direct attention more particularly. Furthermore, in the construction of the wheel referred to the nuts must be removed from the ends of the spokes before the latter can be withdrawn, while with my construction the spokes may be free and quickly slipped out, as described and for the purposes indicated. In addition to this feature of merit I desire to claim the arrangement and construction of my wheel.

I claim—

1. A wheel comprising the usual rim and spokes, a hub for said wheel, one end of which is screw-threaded, the other end being smooth, but provided with a flange, as shown, a spoke-holder D on the smooth end of the hub adapted to bear against the said flange, the holder J at the other, a series of slots in the said holders for receiving the spokes with the heads of the latter beneath the slots whereby said spokes may be pushed into and withdrawn laterally from the said slots so that the entire hub and holders may be removed as described.

2. In a wheel of the character described, the combination of the usual rim, the hub A having a removable spoke-holder at each end, a flange B at one end of the hub as shown, one of the said spoke-holders being held against movement by means of said flanges and the other adapted to slide along the hub, slots in the said spoke-holders, said slots opening through the outer edges of the holders, the spokes F for entering the slots laterally, the same having heads for passing beneath the slots and bearing against the holders as set forth, and means on the hub for shifting the movable spoke-holder to tighten the spokes as set forth.

3. In a wheel of the character described the combination of the wheel-rim, the spokes F of a fixed length, the hub A having a flange B near one end, a spoke-holder D at one end of the hub, the same adapted to bear against the said flange, the spoke-holder J on the opposite end of the hub, an adjustable nut I on the hub adapted to bear against and shift the holder J when turned, a series of slots E in the outer edges of the two holders within which the ends of the spokes are adapted to be held and arranged whereby said spokes may be swung laterally to engage the holders by means of said slots or be released therefrom, but adapted to be tightened after entrance by means of the nut I as described.

4. In a wheel of the character described, the combination of the wheel-rim, the hub A, the flange B near one end of the latter, a spoke-holder D placed upon the end of the hub and adapted to bear inward against said flange, the opposite end of the hub being screw-threaded, the nut I adapted to run on the screw-threads, the holder J outside the nut, slots in the outer edges of each holder as set forth, the spokes F of a fixed length and headed at each end and held in the rim by one of such heads, the other end adapted to enter the slots in a sidewise manner whereby said heads are carried beneath the slots, and against the holder as described in tightening the said nut I, said nut also adapted to tighten the wheel uniformly as set forth.

5. In a wheel of the character described, the combination of the rim of the wheel, the hub A having a flange near one end, a spoke-holder on the end of the hub and adapted to bear against said flange, notches in the holder and lugs on the hub for engaging said notches to prevent the holder turning on the hub, screw-threads on the opposite end of the hub, a nut therefor, a holder J on the said threaded end and adapted to shift back and forth thereon, slots in the outer edges of the holders as shown, spokes of a fixed length adapted to enter the slots by a sidewise movement substantially as set forth, all the spokes being tightened by pressure of the nut against the movable holder all being arranged substantially as set forth.

In testimony whereof I affix my signature in presence of two witnesses.

GEORGE E. EVANS.

Witnesses:
S. H. HUNT,
E. B. RHEA.